United States Patent
Argoetti

(10) Patent No.: US 9,734,099 B1
(45) Date of Patent: Aug. 15, 2017

(54) QSPI BASED METHODS OF SIMULTANEOUSLY CONTROLLING MULTIPLE SPI PERIPHERALS

(71) Applicant: Micro Lambda Wireless, Inc., Fremont, CA (US)

(72) Inventor: Shlomo Argoetti, Sunnyvale, CA (US)

(73) Assignee: Micro Lambda Wireless, Inc., Fremont, CA (US)

( * ) Notice: Subject to any disclaimer, the term of this patent is extended or adjusted under 35 U.S.C. 154(b) by 0 days.

(21) Appl. No.: 15/499,640

(22) Filed: Apr. 27, 2017

(51) Int. Cl.
G06F 3/00 (2006.01)
G06F 13/16 (2006.01)
G06F 13/10 (2006.01)

(52) U.S. Cl.
CPC ........ G06F 13/1689 (2013.01); G06F 13/102 (2013.01); G06F 13/1673 (2013.01)

(58) Field of Classification Search
CPC . G06F 13/1689; G06F 13/102; G06F 13/1673
See application file for complete search history.

(56) References Cited

U.S. PATENT DOCUMENTS

| | | | | |
|---|---|---|---|---|
| 4,958,277 A * | 9/1990 | Hill | ........................ | G06F 13/423 710/52 |
| 2002/0133662 A1 * | 9/2002 | Cheung | ................. | G06F 13/385 710/310 |
| 2010/0110916 A1 * | 5/2010 | Pratt, Jr. | ............... | H04W 24/00 370/252 |
| 2016/0259756 A1 * | 9/2016 | Ahmad | ................. | G06F 15/167 |
| 2016/0292109 A1 * | 10/2016 | Schumacher | ....... | G06F 13/3625 |
| 2017/0168978 A1 * | 6/2017 | Mishra | ................ | G06F 13/4282 |

OTHER PUBLICATIONS

"AN4760 Application note—Quad-SPI (QSPI) interface on STM32 microcontrollers" STMicroelectronics, Apr. 2016.*
"Quad Serial Peripheral Interface (QuadSPI) Module Updates" by David Paterson, © 2012 Freescale Semiconductor, Inc.*
"Serial Peripheral Interface Bus", uploaded from https://en.wikipedia.org/wiki/Serial_Peripheral_Interface_Bus on Apr. 5, 2017.
"Serial Peripheral Interface (SPI) Bus Tutorial", uploaded from http://www.corelis.com/whitepapers/BusPro-S_SPI_Tutorial.pdf on Apr. 5, 2017.
Chenakin, A, "Frequency Synthesis: Current Solutions and New Trends", Microwave Journal, May 2007, pp. 256-266.
Chenakin, A, "Building a Microwave Frequency Synthesizer—Part 1: Getting Started", High Frequency Electronics, May 2008, pp. 58-67.

* cited by examiner

Primary Examiner — Jing-Yi Shyu
(74) Attorney, Agent, or Firm — Stephen E. Zweig

(57) ABSTRACT

System and method of using a processor driven master Quad-SPI (QSPI) bus or interface to simultaneously and time-synchronously transmit different streams of data from a FIFO buffer to a plurality of different slave SPI interface peripherals. Here the QSPI interface data ports are configured to simultaneously transmit multiple 1 bit wide streams of different binary data and different chip select commands on an SPI clock cycle synchronized basis. Additional SPI slave peripherals may be controlled by use of additional non-SPI clock synchronized GPIO chip select commands and suitable logic gates. These methods are useful for creating a variety of embedded systems with faster response speeds, such as improved microwave frequency synthesizers with faster frequency changing times.

17 Claims, 5 Drawing Sheets

QSPI BASED METHODS OF SIMULTANEOUSLY CONTROLLING MULTIPLE SPI PERIPHERALS

BACKGROUND OF THE INVENTION

Field of the Invention

This invention is in the field of serial peripheral interface (SPI) busses, and related serial communications methods used for short distance communication between embedded system devices.

Description of the Related Art

The serial peripheral interface (SPI) bus is a popular embedded system interface, often used for communications between a "master" device, such as a microprocessor or microcontroller (here called a processor), and various "slave" system peripherals.

In the standard SPI bus scheme, a master device controls the timing of clock pulses (often designated as SCLK, SCK or CLK for "serial clock") using a SCLK port. The various master clock pulses output from the SCLK port are transmitted, via appropriate wires, to the SCLK/CLK ports of one or more various SPI slave peripheral devices. These clock pulses are used to synchronize communications between the master device and various SPI slave peripherals. One master SLCK port can be connected over a SCLK/CLK wire to many different SPI slave peripheral SCLK/CLK ports, so that they are all time synchronized.

The master device typically uses another serial port, often designated the MOSI port (for master output save input), to transmit serial data, in the form of time sequential binary 1 and 0 signals, over a MOSI wire to the various slave peripherals. The different slave peripherals are often all connected to the same MOSI wire via their respective single MOSI ports. The master device transmits serially transmits data, on a one bit per clock pulse basis, in the form of binary 1 and 0 signals.

In the standard SPI bus scheme, one MOSI wire may connect to all of the slave peripherals, and thus each slave peripheral may see the same series of bits. Thus in this configuration a single standard MOSI port or output acts like a "party line", talking to a plurality of different slave SPI peripheral devices.

To allow a SPI master device to send (and receive) data only from certain selected SPI slave peripheral devices, a SPI master device can send "slave select" or "chip select" (called SS or CS) signals to a corresponding SS/CS port on the various slave SPI peripheral devices. When a particular SPI slave peripheral device receives a chip select signal on its (usually one) SS/CS port, that particular slave select peripheral knows that it should receive data via its MOSI and (SCLK) ports. In the absence of the appropriate chip select signal, the slave SPI peripheral device will ignore data signals from its particular MOSI port.

To send SS/CS chip select signals, the SPI master device can either use a dedicated SPI SS/CS port, or alternatively use other ports, such as general purpose input output ports (GPIO) ports.

To allow various slave peripherals to transmit data back to the master device, the various slave peripherals often have a master input slave output (MISO) port configured to transmit serial binary data back to the master device's MISO port via a MISO wire. The rate of data transmission on the MISO port is also controlled by the SPI mater device's SLCK/CLK pulses. The standard SPI MISO port also operates on a "party line" basis, where one SPI master device MISO port may be connected to a various MISO ports on various slave SPI peripheral devices. Chip select commands are also used to determine which slave SPI device can transmit at any given time, and typically a SPI slave peripheral device will only transmit data back to the SPI master device when that particular slave device has been selected via its SS/CS port.

Typically the master device will send (or receive) data from the various slave devices in groups of 8 bit words (e.g. n×8 bits, where n can be 1 or greater). However other word sizes (12 bit words, 32 bit words, etc.) may also be used.

After the SPI bus/interface was introduced, an extension of this interface, called the Quad serial peripheral interface (Quad-SPI, or QSPI), was introduced. The QSPI interface is often designed to be backward compatible with the earlier SPI interface, but the QSPI interface also adds additional functionality. In particular, the QSPI interface is oriented towards transmitting or receiving data at a much faster rate of a nibble (e.g. 4-bits) per SCLK/CLK clock pulse, rather than the 1-bit per SCLK/CLK rate of the earlier SPI bus/interface. Most recently, an Octal-SPI bus/interface has also been introduced, which, while backward compatible with the SPI and QSPI interface, can transmit data at the still faster rate of a byte (e.g. 8-bits) per SCLK/CLK clock cycle. For conciseness, however, we will generally use the term QSPI to denote either the QSPI or Octal-SPI bus/interface.

QSPI interface generalizes the SPI interface's 1 bit wide MOSI port and 1 bit wide MISO into four input/output ports that can be configured so that all four ports can either all simultaneously transmit data during a given operation, or all four ports can simultaneously receive data during a given operation. Here, at least when configured so that all four master device input/output ports are configured to transmit data, these four ports will be referred to as the QSPI data outputs. These four ports are often numbered as IO0, IO1, IO2, IO3, or alternatively as QSPI0, QSPI1, QSPI2, and QSPI3 ports.

The QSPI interface is most commonly used to allow QSPI equipped processors to send and receive data from QSPI interface equipped memory type slave peripherals, such as flash memory chips, and the like. Because they are sending data at a rate of a nibble (4-bits) per SPI clock pulse, rather than at the slower SPI 1-bit per SPI clock pulse, such QSPI peripherals and devices can thus send and receive four times as much data per SCLK clock pulse as earlier SPI interfaces. Because the QSPI interface has been designed to be backward compatible with the SPI interface, such QSPI interfaces can also be used to send and receive data from standard SPI equipped devices and peripherals as well.

A simple introduction to these various concepts can be found in the Wikipedia Serial Peripheral Interface Bus article provided by Wikipedia (as of Apr. 5, 2017) at en.wikipedia.org/wiki/Serial_Peripheral_interface_Bus, and by the SPI Bus Tutorial white paper provided by Corelis.com, www.corelis.com/whitepapers/BusPro-S_SPI_Tutorial.pdf. Both have been provided as non-patent literature for this application.

Frequency Synthesizers:

Frequency synthesizers, described by Chenakin, U.S. patent application Ser. No. 15/469,434, the entire contents of which are incorporated by reference, are electronic systems that translate input signals at a first frequency into output signals at a second (and typically higher) frequency.

Such frequency synthesizers can often produce output signals in the Gigahertz frequency region or higher. Frequency synthesizers can be viewed as being an example of a type of embedded system where a master processor device often communicates with various system peripherals such as phase locked loops, voltage controlled oscillators, mixers, phase shifters, frequency dividers, synthesizers, and the like. At least some of these various components can be implemented as, or controlled by, various SPI equipped peripherals.

Additional background on frequency synthesizers can be found in Chenakin, *"Frequency Synthesis: Current Solutions and New Trends"*, *Microwave Journal*, May 2007, pages 256-266; and Chenakin *"Building a Microwave Frequency Synthesizer—Part 1: Getting Started"* in *High Frequency Electronics*, May 2008, pages 58-67.

BRIEF SUMMARY OF THE INVENTION

Relative to other standard interfaces/busses, which tend to use more complex addressing schemes, and thus require more hardware to implement, SPI interface is unusually simple and low cost. As a result, SPI interfaces are presently provided as a standard control port for a large number of integrated circuit chip devices. Thus to keep both costs and development time down, there is a large incentive to use SPI interface components as the building blocks for a wide variety of different embedded systems, such as frequency synthesizers.

The present invention was inspired, in part, by the need to very quickly change the output frequency of an improved frequency synthesizer. This improved frequency synthesizer comprised multiple integrated circuit chip type peripheral devices, and the desired improvement was an improved speed of changing the output frequency change.

To change the output frequency very quickly, the operating parameters of multiple peripheral devices needed to be altered on as close to a simultaneous basis as possible. That is, to achieve the desired improvement, the improved frequency synthesizer needed to simultaneously change the operating parameters of multiple peripheral devices on a precise (clock cycle level of time accuracy) basis.

Given the ubiquity of the SPI interface, this in turn meant that SPI commands needed to be sent from a SPI master control processor to multiple slave SPI peripherals at preferably the identical clock cycle time. Here, however, the limitations of the standard SPI interface prevented this from being done.

Low cost single core processors, such as ARM processors, typically perform one task (e.g. loading registers, sending registers to an output) one step at a time. Although it is common for processors to be equipped with multiple SPI interfaces, the necessity for the processor to sequentially configure each different SPI interface, and establish independent SCLK/CLK clock signals for each SPI interface, means that the different SPI equipped peripherals will receive their control signals at different times, which in the case of the improved frequency synthesizer, would result in slower than optimal rates of frequency change.

Further, if each of the different SPI equipped peripherals are controlled by the same master SPI interface, the necessity to use SS/CS (chip select) signals to send data to first one SPI peripheral, and then a different SPI peripheral, means that again, the different SPI equipped peripherals will receive control signals at different times.

The invention is based, in part on the insight that by using a processor equipped with at least a QSPI interface, and appropriate software or firmware, software controlled methods employing a first in first out buffer (FIFO) buffer memory can be created. This FIFO buffer method can work with the QSPI interface to simultaneously send commands (e.g. different commands) to multiple slave SPI peripherals with exact SLCK clock timing precision. Among other benefits, such a system can enable improved low cost frequency synthesizers to be produced that can change frequencies faster than was possible using prior art SPI based methods.

The invention is also based, in part, on the insight that since different slave SPI peripheral devices are configured to only receive data when they receive the appropriate chip select (CS) commands, to ensure that multiple slave SPI peripherals receive data at the same exact clock cycle, it is also necessary to send both data and chip select commands (or at least chip select masking commands) using the QSPI data ports. This way a given peripheral chip can be configured to receive data (or not receive data) in precise time-synchronization with the data streaming out over other QSPI data ports. Thus some master device QSPI data ports will be used to stream data for the various SPI slave peripheral devices, while other QSPI data ports will be used to stream SS/CS chip select commands (or chip select mask commands). This method allows both multiple streams of SPI data and multiple streams of SPI chip select commands to be transmitted at the same time, all streams being precisely synchronized to each other at the same SPI clock cycle level of time resolution.

The invention is also based, in part, on the insight often an overall device (e.g. the frequency synthesizer) may comprise more than two slave SPI peripheral devices. Due to the fact that the QSPI data port (interface) has only four data lines, if two QSPI data lines are used to stream data, then only two QSPI lines remain to stream precisely time-synchronized chip select (CS) commands. To extend the number of slave SPI peripheral devices that can be addressed using this scheme, it can be further useful additional logical devices to further direct the time-synchronized chip select (CS) commands from the QSPI data lines. In some embodiments, this can be done using additional chip select commands provided by general purpose input output ports (GPIO ports). Although these GPIO ports, being separate from the QSPI port, may thus be only capable of being switched on and off at slower or different rate (i.e. not to the same SPI clock cycle level of synchronization as the QSPI data port chip select commands), these GPIO ports can optionally, in some embodiments, help the system address a larger number of SPI slave devices than might otherwise be the case.

Note that although the present invention was, to some extent, motivated by the need to make a low cost frequency synthesizer with improved operating characteristics, the concepts described herein may be used for a large number of alternative embedded systems, and the frequency synthesizer example described herein is not intended to be limiting.

BRIEF DESCRIPTION OF THE DRAWINGS

FIG. 2 shows the invention being used to improve the performance of an otherwise prior art frequency synthesizer design. Here the overall frequency synthesizer may be under processor control, with the individual synthesizer components further being implemented or controlled by various slave SPI peripherals such as digital synthesizers, phase detectors, and the like.

DETAILED DESCRIPTION OF THE INVENTION

Figure 1:
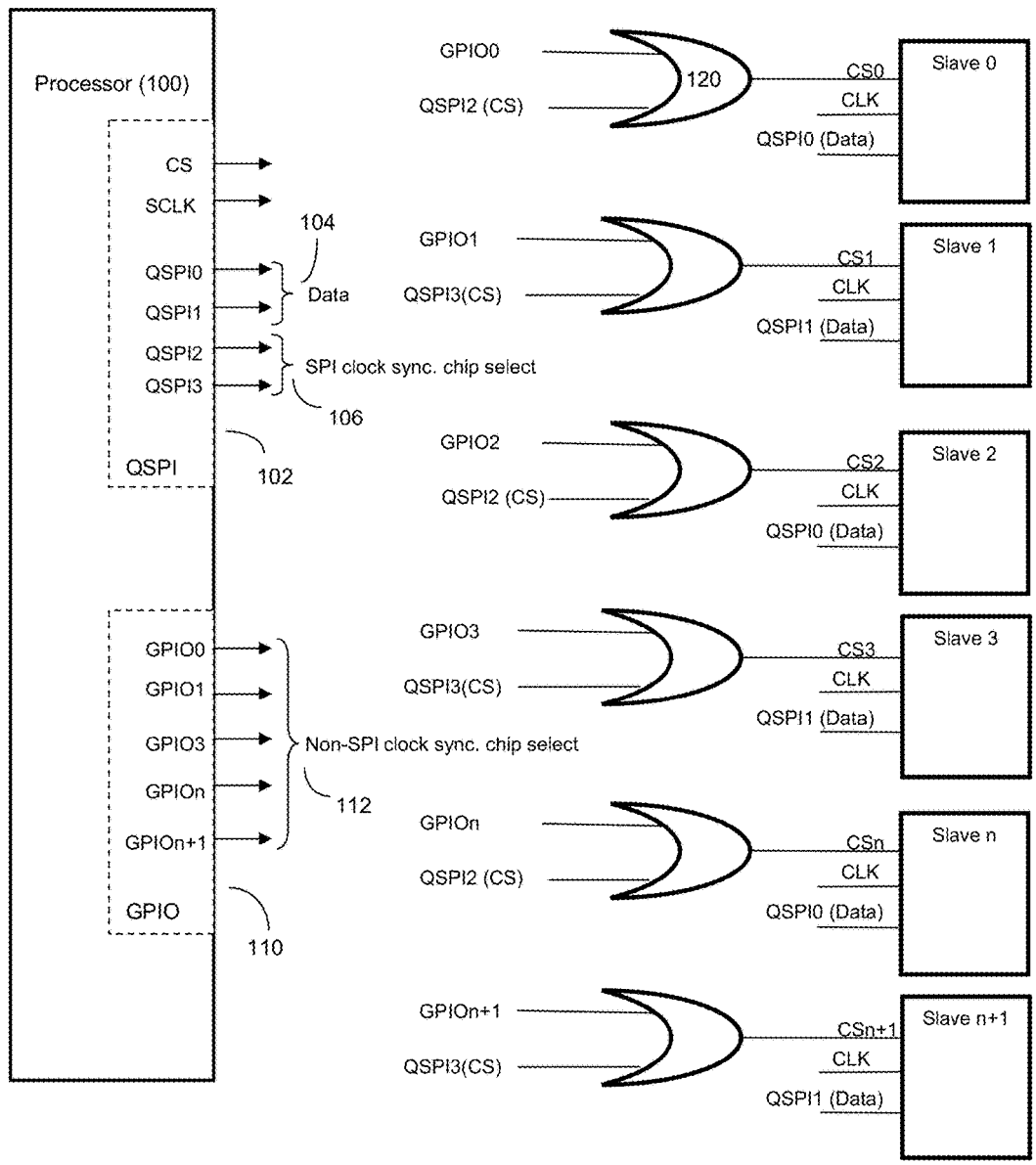
FIG. 1 shows an overview of a QSPI port equipped processor that is also equipped with various general purpose GPIO ports. In this embodiment, additional slave SPI peripherals may be driven by further directing the fast, SPI clock synchronized, chip select signals from the QSPI data output lines with various logical gates, such as "OR" gates, and additional, non SPI clock synchronized, chip select signals from various general purpose input output (GPIO) outputs.

Terminology: In this disclosure, the SPI slave select (SS) pin, port, line, wire and command is frequency referred to in the alternative as the chip select (CS) pin, port, line, wire, and command. Similarly the SPI SCLK clock port is frequently referred to in the alternative as the CLK port.

When the actual chip select signals sent to the individual slave SPI devices are created by using a logic gate to perform a logical operation on a first set of chip select signals transmitted by a QSPI data port, with a second set of chip select signals transmitted by a non-QSPI data port (such as a GPIO port), then the resulting signal is often referred to as a "chip select mask".

Here the term "processor" will be used to designate both microprocessors and microcontrollers.

Further, in this disclosure, "simultaneously" and "time-synchronously" will be used to designate a time resolution of one SPI clock pulse. That is, different slave SPI peripherals may receive different data streams, transmitted over different QSPI data lines, at the same SPI clock pulses.

In some embodiments, the invention may be a system and method of using a processor driven master QSPI interface to simultaneously and time-synchronously transmit data from a FIFO buffer to a plurality of slave SPI interface peripherals.

This method may comprise using the processor to load a FIFO buffer, designated for use by this master QSPI interface, with at least two streams of time-synchronized SPI slave peripheral device data. This time-synchronized data is ultimately simultaneously transmitted to a plurality of slave SPI interface peripherals. This FIFO buffer will typically comprise a FIFO memory width of at least 4 bits, and often an arbitrary length of that is often a multiple of 32 bits. Here each bit position along the FIFO memory buffer can be viewed as being the "swim lane" for that particular serial data stream.

As an example, the FIFO buffer can be a rectangular 4×32 array of bits (e.g. the FIFO buffer has a width of at least 4 bits, and a length of at least 32 bits), every bit in this FIFO buffer array having a buffer width (or "swim lane") coordinate of 0..3, and a buffer length (or time of serial output) coordinate of 0..31.

In some embodiments, this FIFO buffer may be a software or firmware implemented FIFO buffer residing in either general purpose memory and/or processor general purpose memory, or other memory as desired. In such embodiments, the processor will typically use the invention's software or firmware to load and manage this software or firmware implemented FIFO buffer according to the methods disclosed herein.

As previously discussed, this master QSPI interface will typically comprise at least a processor controlled SCLK clock output, and at least four FIFO buffer controlled QSPI data outputs. This QSPI interface, and associated firmware, will typically be configured to simultaneously transmit, in a processor controlled clock synchronized manner, at least four bits from the FIFO buffer's memory width, per SPI clock pulse (at least during active operation, and neglecting rest periods and other breaks between transmitting groups of SPI data).

As previously discussed, each of the various slave SPI interface peripherals will typically comprise at least a SCLK clock input (often called a CLK input), a SS/CS chip select input, and a MOSI input configured to receive data (e.g. a stream of binary serial data) from the master QSPI interface.

According to the invention, the processor is configured (often by appropriate firmware) to load the FIFO buffer with at least two streams of time synchronized data. Each individual data stream transmits data serially in its own "swim lane", in a one bit per clock pulse manner. So the output is binary serial data (e.g. a stream of 1's and 0's). That is, each stream occupies its own data stream specific bit position in its "swim lane" position in the FIFO memory width.

Thus these streams can simultaneously occupy their own portions (swim lanes) of the FIFO memory width when the FIFO buffer is transmitted, and the method thus creates at least two Time Synchronized Data (TSD) lines over at least two of the FIFO buffer controlled QSPI data outputs.

According to the invention, the processor is also configured to load the FIFO buffer with at least one stream (and often two streams, or even more streams if an octal-SPI interface is used) of slave SPI peripheral chip select commands. These slave SPI peripheral chip select commands are configured to control, at a precise SPI clock level of time synchronization, when each of the various slave SPI interface peripherals is to receive its particular stream of time synchronized data.

Here, a tricky aspect of the invention is that each stream of slave SPI peripheral chip select commands also occupies its own command stream specific bit position (e.g. swim lane) of the FIFO memory width. Thus when the FIFO buffer is finally transmitted, this creates at least one (and often two or even more) Time Synchronized Programmable Chip Select (TSPCS) lines over at least one of the FIFO buffer controlled QSPI data outputs. Note that these time synchronized programmable chip select lines (TSPCS) are thus in precise SPI clock synchronization with the time synchronized data lines (TSD).

According to the invention, the processor, FIFO buffer, and the master QSPI interface then use the processor controlled SCLK output, and at least three of the four FIFO buffer controlled QSPI data outputs (often all four QSPI data outputs will be used) to simultaneously transmit at least two streams of time synchronized data (e.g. the TSD lines) and at least one stream of slave SPI peripheral chip select commands (usually two streams of slave SPI peripheral chip select commands will be transmitted as two TSPCS lines) to the various SPI interface peripherals.

FIG. 1 shows an overview of a QSPI equipped processor (100), with a QSPI port (102). This processor is also equipped with various general purpose GPIO ports (110). In this embodiment, additional slave SPI peripherals (slave 0 . . . slave n+1) may be driven by logical operations (using logic gates, such as "OR gates 120) to operate on the fast, SPI clock synchronized, chip select signals from the QSPI data output lines (106). In the embodiment shown in FIG. 1, these OR gates (120) also operate on additional (non-SPI clock synchronized) chip select signals (112) from various processor general purpose input output (GPIO) outputs. (Note that as previously discussed in some embodiments, the processor driven master QSPI interface 104 can also comprise a master Octal SPI interface.)

One example of a low cost, QSPI equipped processor, which may be used in the present invention, includes the Renesas S7G2 microcontroller. This device is based on the ARM Cortex-M4 microcontroller, and among other features includes a QSPI interface and up to 172 general purpose input output (GPIO) ports. The QSPI interface includes a QSPI clock output pin, a QSPI slave output pin, and four QSPI data input/output ports (here we will mostly be focusing on using the four QSPI data ports as output ports). This particular processor is discussed in more detail in Renesas publication R01DS0262EU0100 Rev.1.00, issued Feb. 23, 2016.

Note that although in some embodiments, the FIFO buffer and the QSPI port may be configured to issue only two streams of slave SPI peripheral chip select commands (two TSPCS lines 106), in some embodiments, it may be desirable to address more SPI peripheral chips/devices than might otherwise fit in this scheme.

For example, FIG. 1 shows the processor (100) addressing n+1 different slaves, where n is at least 5, and also shows various logic gates (120), such as "OR" gates, further modifying or controlling the chip select signals. These logic gates (120) are used, along with additional chip select commands from the GPIO ports (112) or other output ports, to extend the number of slave SPI peripheral devices that can be addressed.

Thus in some embodiments, the invention may further use using at least one logic gate (120) to intercept the at least one stream of slave SPI peripheral chip select commands (such as the two TSPCS lines 106). This at least one logical gate (120) can then use at least one logical operation (here an "OR" operation is shown) on this at least one stream of slave SPI peripheral chip select TSPCS commands (106) to then control at least some SS/CS chip select inputs on at least some of the slave SPI interface peripherals. This scheme acts to direct the streams of data from the time synchronized data (TSD lines 104) to the various selected (specific) slave SPI interface peripherals.

As previously discussed, this invention was initially inspired by a need to make a higher performance (e.g. faster switching) microwave frequency synthesizer. Thus in some embodiments of the invention, at least some of the various slave SPI interface peripherals, such as those shown in FIG. 1, can be used to produce an improved, fast switching, microwave frequency synthesizer. Thus slave 0 might be a digital frequency synthesizer; slave 1 might be a phase detector, and so on.

Figure 2:
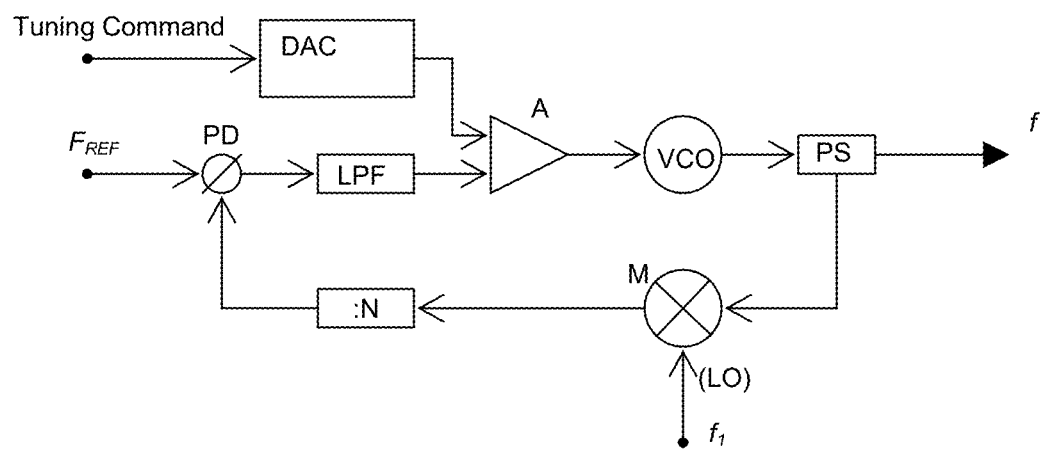

FIG. 2 shows the invention being used to improve the performance of one type of prior art frequency synthesizer, thus producing an improved prior art frequency synthesizer. Here the overall frequency synthesizer may be under processor control, with the individual synthesizer components further being implemented or controlled by various slave SPI peripherals such as digital synthesizers, phase detectors, and the like. It should be evident that may different types of frequency synthesizer designs (and many other types of devices as well) can be improved according to the methods disclosed herein. Thus FIG. 2 represents only one type of frequency synthesizer device that might be improved by the methods described herein.

In such prior art frequency synthesizers, often called phase lock loop (PLL) frequency synthesizers, a voltage controlled oscillator (VCO) with a frequency output locked in relation to a reference frequency f may be used. The frequency signal output from the VCO goes to a power splitter (PS), which splits the VCO frequency signal into various portions, including an output portion (f), and another portion used to control the PLL frequency synthesizer. The control portion of the VCO frequency signal is sent to a frequency divider (:N), which divides this portion of the VCO frequency signal by an integer N. The resulting frequency divided signal then goes to a phase detector (PD). The phase detector compares this signal with a reference frequency ($F_{REF}$). Low pass filters (LPF) may also be used.

In more sophisticated prior art frequency synthesizers, the amount of phase noise produced by the frequency synthesizer can be reduced by feeding back a portion of the VCO output f to the phase detector (PD) using a power splitter (PS) and a mixer (M). A digital-to-analog converter DAC can be used to provide digital tuning commands for coarse tuning.

Due to the simplicity and popularity of the SPI protocol, many electrical devices that can potentially be used in various frequency synthesizer components incorporate the SPI interface as part of the standard design. Thus processors to control tuning, digital synthesizers, phase detectors, and the like are presently available at low cost as SPI protocol integrated circuit chips.

An example of such devices can include the Analog Devices AD9912 GSPS direct digital synthesizer with a 14-bit digital to analog converter, the Analog Devices ADF4002 phase detector/frequency synthesizer, and the like. More sophisticated frequency synthesizers can comprise four, five, and even more of such SPI equipped integrated circuit chips.

Figure 3:
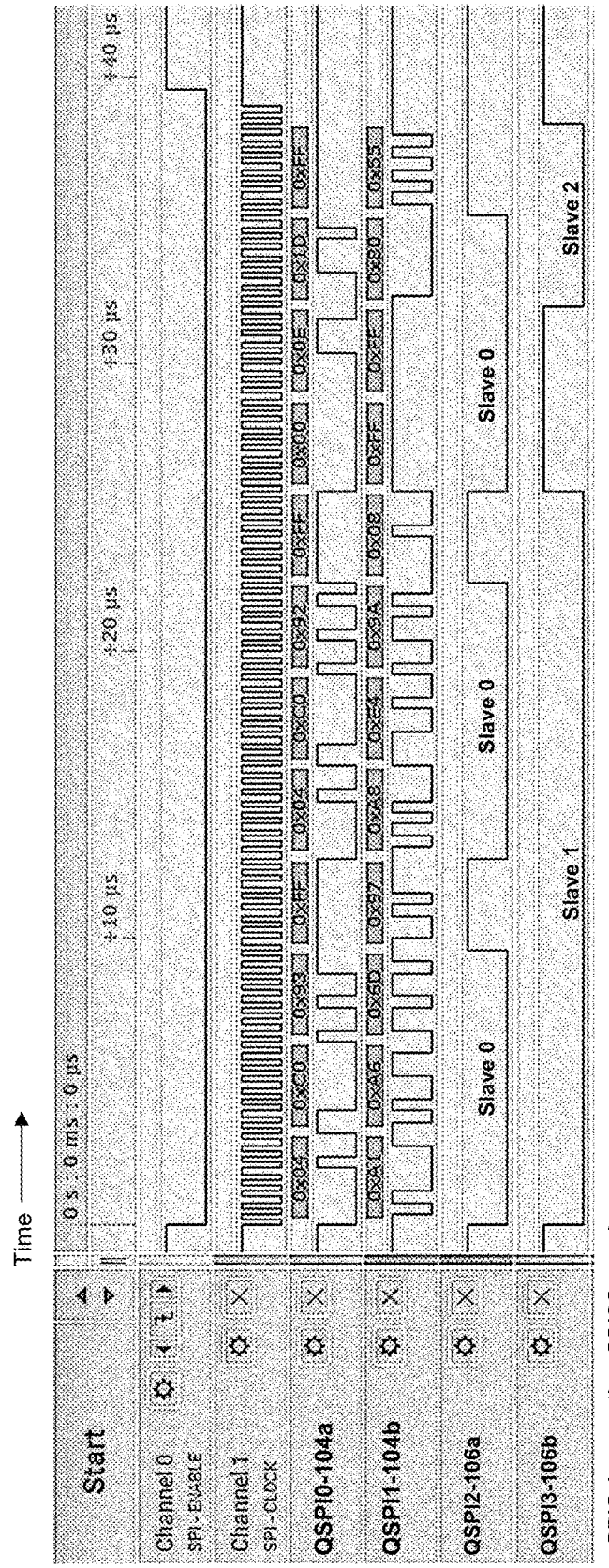
FIG. 3 shows a graph of various QSPI outputs versus time showing how a SPI master device (processor) can transmit QSPI signals according to the invention. Here the SPI master device is transmitting a SPI clock signal (SLCK or CLK) signal to the various slave SPI peripherals, and is also simultaneously using its four QSPI outputs to transmit: a) two different time-synchronized data streams (time synchronized data), and b) two streams of chip select commands. Note that all of these streams are precisely time synchronized, at the same SPI clock pulse level, with each other.

FIG. 3 shows specific example of how a QSPI port equipped processor can use the FIFO buffer to transmit QSPI signals according to the invention. In particular, FIG. 3 shows a graph showing the binary pulses of 1's and 0's as a function of time along the various QSPI outputs.

Here the master device is transmitting a SPI clock signal (SLCK/CLK) signal to the various slave SPI peripherals on Channel 1, SPI-clock. The master device is also simultaneously using its four QSPI outputs to transmit two different time-synchronized data streams (time synchronized data (QSPI0-104a, QSPI1-104b). This corresponds to FIG. 1 (104).

The master device is also simultaneously transmitting two streams of chip select commands (QSPI2-106a, QSPI3-106b). This corresponds to FIG. 1 (106). Note that all of these streams are precisely synchronized to the same SPI clock pulse with each other. That is, the boundaries of the bit transitions between 1 and 0 are always synchronized to the bit transitions on the SPI-Clock.

Additional, non-SPI clock synchronized, chip select commands from other ports, such as general purpose IO ports (see FIG. 1, GPIO ports 112) which may optionally be used, in conjunction with additional logical gates (120), are not shown in this figure.

FIG. 3 also shows that some chip select commands issued, with precise SPI clock pulse synchronization over QSPI2-106a may be used to control when a certain slave SPI peripheral device, such as slave 0 is to obtain its serial data over data line QSPI0 104a. Similarly other chip select commands, again issued with precise SPI clock synchronization over QSPI3-106b, can be used to control when a different slave SPI peripheral device, such as slave 1, is to simultaneously receive different serial data over data line QSPI1-104b at the same precise time that the slave 0 device is also receiving its data. So in this example, we are simultaneously sending data to two SPI slave devices, thus doubling the normal rate of transmitting SPI data.

By use of additional GPIO lines and logical gates (not shown), still other slave SPI peripheral devices, such as Slave 2, can also simultaneously receive data from the QSPI1-104b data line at the same time that Slave 0 is also receiving data.

Note further that in FIG. 3, the length of the data sent to Slave 1 (when the QSPI3-106b line is low) is longer than the length of the data sent to Slave 0 (when the QSPI2-106a line is low), and further the length of the data sent to Slave 2 (the latter time when the QSPI3-106b line is low) is still shorter than the length of the data sent to Slave 0.

More specifically, in some embodiments of the invention at least two of the various SPI interface peripherals may be configured to accept SPI data of different lengths, at least one length being a shorter length (such as slave 24), and another length being a longer length (such as slave 12).

Here the processor may be used to adjust the various streams of time synchronized data (TSD) in the FIFO buffer to a same length by (for example) padding the shorter length of the time synchronized data stream (the shorter TSD line) with null bits.

The processor may also be used to load the FIFO buffer with at least one stream of slave SPI peripheral chip select commands (often two streams, such as two TSPCS lines) configured to control when both an SPI interface peripheral (e.g. slave 0) is configured to read the shorter length of its data, and when a different SPI interface peripheral (e.g. slave 1) is configured to read the longer length of its data.

Note that in FIG. 3, and in many of the QSPI examples provided in this disclosure, the master QSPI interface will comprise four FIFO buffer controlled QSPI data outputs, and the FIFO buffer will comprise a FIFO memory width of 4 bits (one bit each for QSPI0-104a, QSPI1-104b, QSPI2-106a, and QSPI3-106b). Here the processor will use two of the FIFO buffer controlled QSPI data outputs (e.g. QSPI0-104a, QSPI1-104b) to transmit two Time Synchronized Data (TSD) lines. The processor will also use two of the FIFO buffer controlled QSPI data outputs (e.g. QSPI2-106a, QSPI3-106b) to transmit two Time Synchronized Programmable Chip Select (TSPCS) lines. However other schemes are possible, and with an octal-SPI interface, there are many permutations of TSD lines and TSPCS lines that may be used.

Figure 4:
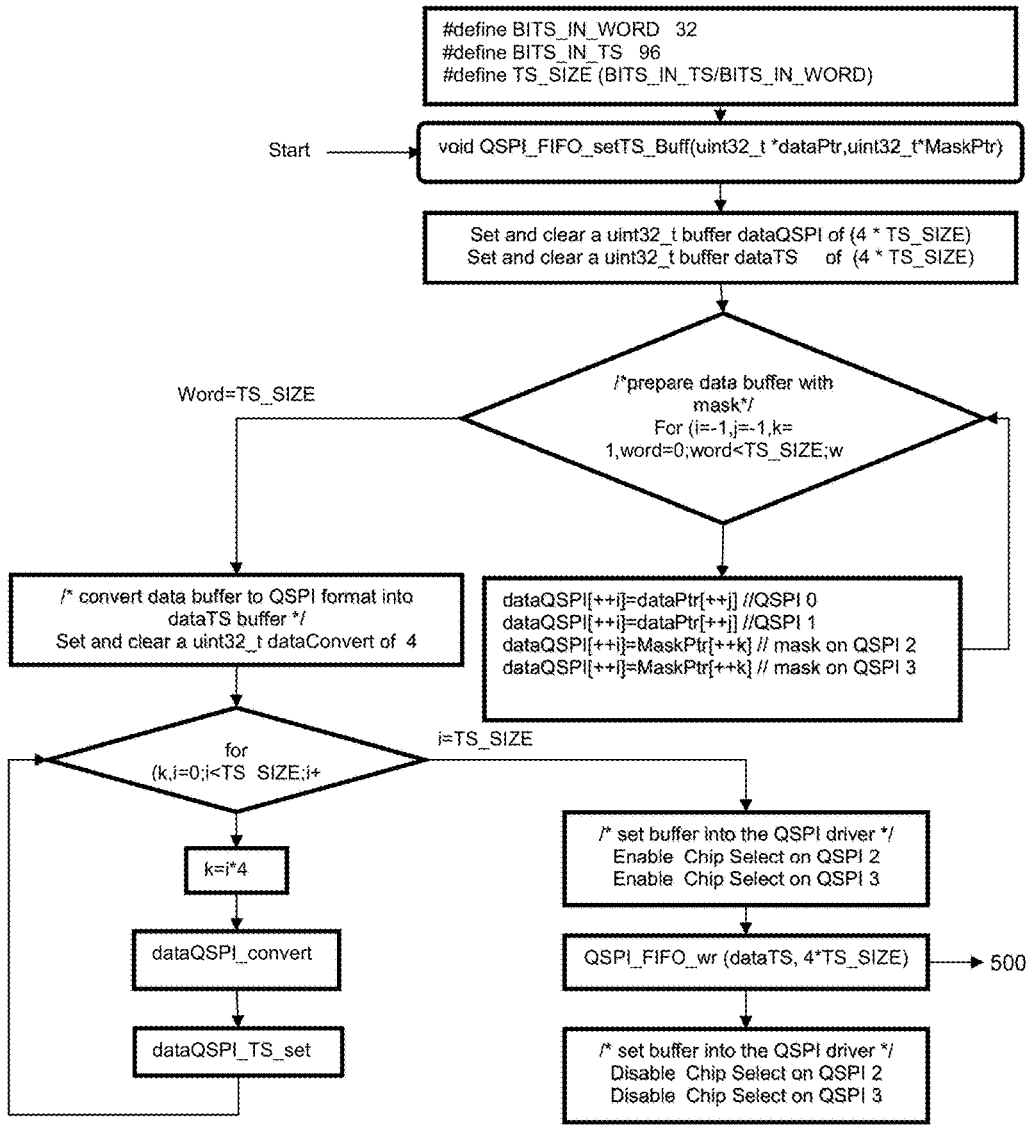
FIG. 4 shows a flow chart showing how the invention's FIFO buffer methods, used to implement the present QSPI concepts, may be implemented in the SPI master processor's firmware.

FIG. 4 shows a "C" code example of how the invention's FIFO buffer based methods, used to implement the present QSPI concepts, may be implemented in processor firmware or other type of software.

Figure 5:
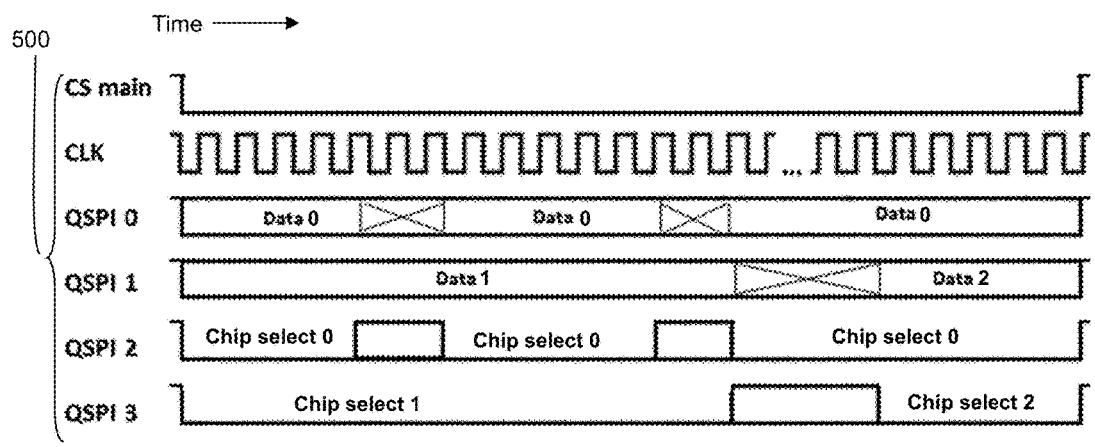
FIG. 5 shows an example of the various QSPI SPI clock cycle synchronized data streams created by the firmware previously shown in FIG. 4.

In the specific embodiments illustrated in FIG. 3, FIG. 4, and FIG. 5, the system is configured to send data in time slot groups of 96 bits each, where each time slot is here configured as three sets of 32 bits. So in this embodiment, the invention transmits a first time slot (TS0) group of 96 bits, then, after a brief pause, other optional groups of data, such as a second time slot (TS1) group of 96 bits may be transmitted, and so on, for as long as desired. FIG. 3 shows only the first time slot group (e.g. TS0), with the right side of FIG. 3 showing the brief pause before a second time slot group (e.g. TS1) is transmitted (not shown).

As shown in FIG. 4, according to this embodiment, for each set of data to be transmitted over a given time slot "n (e.g. TSn), repeat the following steps:

1: For TSn (Time Slot "n"), get the 'dataBuffer' to be sent on QSPI data output lines 0 and 1. These represent the two TSD (Time Synchronized Data) streams or lines of time synchronized data, where each stream has its own data stream specific position of the FIFO memory width. Note that both streams can simultaneously occupy their own portions of the FIFO memory width when the FIFO buffer is transmitted.

In this step, also get the slave peripheral chip select signals (or chip select mask, designated "CS mask") to be sent on the QSPI data output lines 2 and 3. These are used to create the TSPCS (Time Synchronized Programmable Chip Select) streams or lines of slave SPI peripheral chip select commands that are configured to control when each of the various slave SPI interface peripherals is to receive its particular stream of time synchronized data (e.g. the data in the TSD lines). Here as well, each stream of slave SPI peripheral chip select commands occupies its own command stream specific bit position of the FIFO memory width when the FIFO buffer is transmitted. This can be expressed by a void Q_FIFO_setBuff command.

2: For this time slot "n", use the above "dataBuffer" and the above "CS mask" to create the transmit buffer (TxBuffer) to be sent on QSPI data output lines 0, 1, 2, 3.

3: If it is desired to use additional logical gates to send data to more slave SPI peripheral devices than can be handled via just the two Time Synchronized Programmable Chip Select (TSPCS) lines, then also enable additional chip select lines, such as the GPIO "Chip Select 0" and "Chip Select 1" lines. This can be done by, for example enabling various processor general purpose input output (GPIO) lines (112). These additional chip select lines work in conjunction with the two TSPCS lines (106), and the additional logical gates (120), to help select which slave SPI peripheral devices is to be addressed during this time slot.

4: Transmit the contents of the buffer over the four QSPI lines 0, 1, 2, 3. This can be implemented by commands such as "Send (uint32_t*)TxBuffer to QSPI_FIFO_wr. In this embodiment, this is done as "n" 32 bit words, where n is an integer greater than 0. For example, as previously discussed, FIG. 3 shows the system transmitting 3*32=96 bits at a time. This output is shown as (500) in FIG. 4, and is shown visualized in (500) in FIG. 5. A more detailed version of this output can also be seen in FIG. 3.

5: If previously enabled in step 3, then disable the previously enabled additional chip select lines, such as the GPIO "Chip Select 0" and "Chip Select 1" (112) previously discussed above.

Return back to step 1 and repeat for another time slot group TSn as desired. Here FIG. 4 only shows one iteration of this process.

FIG. 5 shows an abstracted example of the various QSPI TSD and TSPCS streams created by the firmware previously shown in FIG. 4. FIG. 5 may also be viewed as a more simplified version of the data previously shown in FIG. 3, and represents a visualization of the data transmitted in FIG. 4 (500). Here QSPI 0 and QSPI 1 are a simplified version of the QSPI0-104*a* and QSPI1-104*b* TSD data stream previously shown in FIG. 3, with the data and gap portions more clearly shown. These two streams correspond to FIG. 1 (104).

In FIG. 5, QSPI 2 and QSPI 3 are a simplified version of the QSPI2-106*a* and QSPI3-106*b* TSPCS chip select streams previously shown in FIG. 3, with the various chip select portions more clearly shown. These two streams correspond to FIG. 1 (106).

Figure 6:
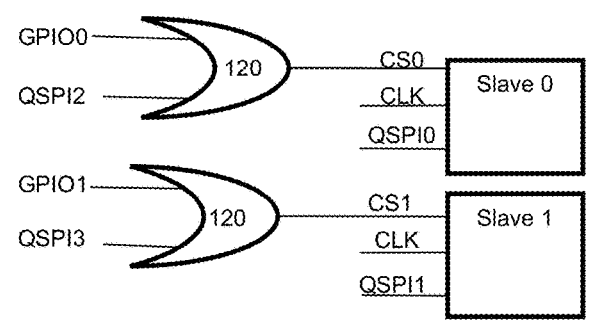
FIG. 6 shows a more detailed example of how the stream of precisely time synchronized chip select signals from the QSPI data streams created by the firmware shown in FIG. 4, and visualized in FIG. 5, may be further directed using logical gates (here "OR" gates), as well as additional SPI chip select signals, here obtained from general purpose input output (GPIO ports).

FIG. 6 shows a more detailed example of how the stream of precisely SPI clock time synchronized chip select signals from the QSPI data streams (106) (QSPI2-106*a*, QSPI3-106*b*) created by the firmware shown in FIG. 4, and visualized in FIG. 5, may be further controlled using logical gates (120), such as "OR" gates, and occasionally by non-SPI clock time-synchronized supplemental chip select signals, obtained here from general purpose input output (GPIO ports) as previously shown in FIG. 1 (112).

As previously discussed, in some embodiments, the invention may use at least one logic gate, such as "OR" gates (120), to intercept at least one stream of the SPI clock synchronized slave SPI peripheral chip select commands (e.g. the TSPCS lines such as QSPI2 and QSPI3, shown in FIG. 1, 106). The one or more logic gates (120) can then use at least one logical operation, such as a logical "OR" operation, on this at least one stream of slave SPI peripheral chip select commands to then control at least some SS/CS chip select inputs (e.g. CS0, CS1) on at least some of slave SPI interface peripherals. This technique can be useful for helping the system direct the various streams of time synchronized data (e.g. various TSD lines such as QSPI0 and QSPI1) to selected slave SPI interface peripherals, such as slave 0 and slave 1.

As FIG. 6 also shows, and as previously shown in FIG. 1, in some embodiments, such as when the processor (100) further comprises at least one general purpose output comprising at least one GPIO output (FIG. 1 110, 112), the processor's at least one GPIO output (112) can also be used to send to send additional, non-SPI clock synchronized, chip select commands to the various logic gates (120). FIG. 6 shows this as the GPIO0 and GPIO1 control signals. The final chip select commands CS0 received by slave 0, and the CS1 received by slave 1, are then in this example: CS0=GPIO0 OR QSPI2, and CS1=GPIO1 OR QSPI3, where OR is the logical OR operation. With appropriate firmware, at least some other types of logical gates, such as AND gates XOR, NOT, NAND, NOR, and ENOR gates may also be used in certain embodiments.

Thus FIG. 6 shows the embodiment where at least one logic gate is at least one "OR" gate, and the at least one logical operation is an "OR" operation. In FIG. 6, the system uses additional chip select commands from at least one GPIO output to control at least some SS/CS chip select inputs on at least some of the slave SPI interface peripherals.

Using the QSPI interface to read data from various slave SPI interface peripherals:

Although this disclosure has primarily focused on writing data from a master processor device QSPI interface to various slave SPI peripheral devices, the function of reading data from the various slave SPI peripheral devices back to the QSPI interface is not disclaimed.

For example, in some embodiments, the various slave SPI interface peripherals can further comprise one or more MISO outputs to transmit data to the master QSPI interface. Here, in some embodiments, the processor driven master QSPI interface and a FIFO buffer can be used to simultaneously receive at least two streams of time synchronized data transmitted by the MISO outputs of the various slave SPI interface peripherals. Here again, each MISO data stream can occupy its own data stream specific bit (e.g. swim lane) of the FIFO memory width.

In other embodiments, for the purposes of reading data, the master QSPI interface can simply be run according to standard SPI protocols, where one of the QSPI data ports can be operated (e.g. by appropriate firmware) as a simple master input slave output MISO port.

The invention claimed is:

1. A method of using a processor driven master QSPI (Quad Serial Peripheral Interface) interface to simultaneously and time-synchronously transmit data from a FIFO (First In First Out) buffer to a plurality of slave SPI interface peripherals, said method comprising:

using said processor to load said FIFO buffer for said master QSPI interface with at least two streams of time-synchronized data intended for simultaneous transmission to said plurality of slave SPI interface peripherals, wherein said FIFO buffer comprises a FIFO memory width of at least 4 bits;

said master QSPI interface comprising at least a processor controlled SCLK (SPI Clock) clock output, and at least four FIFO buffer controlled QSPI data outputs configured to simultaneously transmit, in a processor controlled clock synchronized manner, at least four bits from said FIFO memory width, per SCLK clock cycle, from said FIFO buffer;

each of said plurality of slave SPI interface peripherals comprising at least a SCLK clock input, a SS (Slave Select) chip select input, and a MOSI (Master Output Slave Input) input configured to receive data from said master QSPI interface;

wherein said processor is configured to load said FIFO buffer with said at least two streams of time synchronized data, each stream occupying its own data stream specific bit position of said FIFO memory width, so that all streams can simultaneously occupy their own portions of said FIFO memory width when said FIFO buffer is transmitted, thus creating at least two Time Synchronized Data (TSD) lines over at least two of said FIFO buffer controlled QSPI data outputs;

wherein said processor is further configured to load said FIFO buffer with at least one stream of slave SPI peripheral chip select commands configured to control when each of said plurality of slave SPI interface peripherals is to receive its particular stream of time synchronized data, each stream of slave SPI peripheral chip select commands occupying its own command stream specific bit position of said FIFO memory width when said FIFO buffer is transmitted, thus creating at least one Time Synchronized Programmable Chip Select (TSPCS) lines over at least one of said FIFO buffer controlled QSPI data outputs; and using said processor, said FIFO buffer, and said master QSPI interface to use said processor controlled SCLK clock output, and at least three of said four FIFO buffer controlled QSPI data outputs to simultaneously transmit said at least two streams of time synchronized data and said at least one stream of slave SPI peripheral chip select commands to said plurality of SPI interface peripherals.

2. The method of claim 1, further using at least one logic gate to intercept said at least one stream of slave SPI peripheral chip select commands, and to use at least one logical operation on said at least one stream of slave SPI peripheral chip select commands to then control at least some SS chip select inputs on at least some of said slave SPI interface peripherals, thereby directing said streams of time synchronized data to selected slave SPI interface peripherals.

3. The method of claim 2, wherein said at least one logic gate is at least one "OR" gate, and said at least one logical operation is an "OR" operation.

4. The method of claim 2, wherein said processor further comprises at least one general purpose output comprising at least one GPIO (General Purpose Input Output) output, further using said processor and said at least one GPIO output to send additional chip select commands to said at least one logic gate.

5. The method of claim 4, wherein said at least one logic gate is at least one "OR" gate, and said at least one logical operation is an "OR" operation, further using said additional chip select commands from said at least one GPIO output to control said at least some SS chip select inputs on at least some of said SPI interface peripherals.

6. The method of claim 4, wherein said processor driven master QSPI interface further comprises at least one processor controlled chip select output; and
further using said processor and said at least one processor controlled chip select output to send additional chip select commands to said at least one logic gate.

7. The method of claim 1, wherein at least two of said plurality of SPI interface peripherals are configured to accept SPI data of different lengths, at least one length being a shorter length, and another length being a longer length;
further using said processor to adjust said at least two streams of time synchronized data in said FIFO buffer to a same length by padding said shorter length of said time synchronized data stream with null bits; and
further using said processor to load said FIFO buffer with at least one stream of slave SPI peripheral chip select commands configured to control when both an SPI interface peripheral configured to read said shorter length is to read such data, and when an SPI interface peripheral configured to read said longer length is to read such data.

8. The method of claim 1, wherein said processor driven master QSPI interface also comprises a master Octal SPI interface.

9. The method of claim 1, wherein said FIFO buffer is a software or firmware implemented FIFO buffer residing in at least one of general purpose memory and processor general purpose memory, and wherein said processor uses said software or firmware to load said software or firmware implemented FIFO buffer.

10. The method of claim 1, wherein said plurality of slave SPI interface peripherals further comprise a MISO output to transmit data to said master QSPI interface;
further using said processor driven master QSPI interface and said FIFO buffer to receive at least two streams of time synchronized data transmitted by said MISO outputs of said plurality of slave SPI interface peripherals, each stream occupying its own data stream specific bit of said FIFO memory width.

11. The method of claim 1 wherein at least some of said plurality of slave SPI interface peripherals are used in a fast switching microwave frequency synthesizer.

12. The method of claim 1, wherein said master QSPI interface comprises four FIFO buffer controlled QSPI data outputs, and wherein said FIFO buffer comprises a FIFO memory width of 4 bits;
using two of said FIFO buffer controlled QSPI data outputs to transmit two said Time Synchronized Data (TSD) lines; and
using two of said FIFO buffer controlled QSPI data outputs to transmit two Time Synchronized Programmable Chip Select (TSPCS) lines.

13. A method of using a processor driven master QSPI (Quad Serial Peripheral Interface) interface to simultaneously and time-synchronously transmit data from a FIFO (First In First Out) buffer to a plurality of slave SPI interface peripherals, said method comprising:
using said processor to load said FIFO buffer for said master QSPI interface with at least two streams of time-synchronized data intended for simultaneous transmission to said plurality of slave SPI interface peripherals, wherein said FIFO buffer comprises a FIFO memory width of at least 4 bits;
said master QSPI interface comprising at least a processor controlled SCLK (SPI Clock) clock output, and at least four FIFO buffer controlled QSPI data outputs configured to simultaneously transmit, in a processor controlled clock synchronized manner, at least four bits from said FIFO memory width, per SCLK clock cycle, from said FIFO buffer;
each of said plurality of slave SPI interface peripherals comprising at least a SCLK clock input, a SS (Slave Select) chip select input, and a MOSI (Master Output Slave Input) input configured to receive data from said master QSPI interface;
wherein said processor is configured to load said FIFO buffer with said at least two streams of time synchronized data, each stream occupying its own data stream specific bit position of said FIFO memory width, so that all streams can simultaneously occupy their own portions of said FIFO memory width when said FIFO buffer is transmitted, thus creating at least two Time Synchronized Data (TSD) lines over at least two of said FIFO buffer controlled QSPI data outputs;
wherein said processor is further configured to load said FIFO buffer with at least one stream of slave SPI peripheral chip select commands configured to control when each of said plurality of slave SPI interface peripherals is to receive its particular stream of time synchronized data, each stream of slave SPI peripheral chip select commands occupying its own command stream specific bit position of said FIFO memory width when said FIFO buffer is transmitted, thus creating at least one Time Synchronized Programmable Chip Select (TSPCS) lines over at least one of said FIFO buffer controlled QSPI data outputs; and
using said processor, said FIFO buffer, and said master QSPI interface to use said processor controlled SCLK clock output, and at least three of said four FIFO buffer controlled QSPI data outputs to simultaneously transmit said at least two streams of time synchronized data and said at least one stream of slave SPI peripheral chip select commands to said plurality of SPI interface peripherals;
wherein at least some of said plurality of slave SPI interface peripherals are used in a fast switching microwave frequency synthesizer;
further using at least one logic gate to intercept said at least one stream of slave SPI peripheral chip select commands, and to use at least one logical operation on said at least one stream of slave SPI peripheral chip select commands to then control at least some SS chip select inputs on at least some of said slave SPI interface peripherals, thereby directing said streams of time synchronized data to selected slave SPI interface peripherals;

wherein said processor further comprises at least one general purpose output comprising at least one GPIO (General Purpose Input Output) output, further using said processor and said at least one GPIO output to send additional chip select commands to said at least one logic gate.

14. The method of claim 13, wherein said at least one logic gate is at least one "OR" gate, and said at least one logical operation is an "OR" operation.

15. The method of claim 13, wherein at least two of said plurality of SPI interface peripherals are configured to accept SPI data of different lengths, at least one length being a shorter length, and another length being a longer length;

further using said processor to adjust said at least two streams of time synchronized data in said FIFO buffer to a same length by padding said shorter length of said time synchronized data stream with null bits; and further using said processor to load said FIFO buffer with at least one stream of slave SPI peripheral chip select commands configured to control when both an SPI interface peripheral configured to read said shorter length is to read such data, and when an SPI interface peripheral configured to read said longer length is to read such data.

16. The method of claim 13, wherein said processor driven master QSPI interface also comprises a master Octal SPI interface.

17. The method of claim 13, wherein said FIFO buffer is a software or firmware implemented FIFO buffer residing in at least one of general purpose memory and processor general purpose memory, and wherein said processor uses said software or firmware to load said software or firmware implemented FIFO buffer.

* * * * *